United States Patent
Kagawa et al.

(10) Patent No.: US 6,854,784 B2
(45) Date of Patent: Feb. 15, 2005

(54) AUTOMOBILE DRIP MOLDING, MOUNTING CONSTRUCTION THEREOF AND METHOD OF MOUNTING

(75) Inventors: Mamoru Kagawa, Wako (JP); Hiroyuki Sase, Wako (JP); Tetuji Tamura, Ibara (JP)

(73) Assignees: Honda Giken Kogyo Kabushiki Kaisha, Tokyo (JP); Katayama Kogyo Co., Ltd., Okayama (JP)

( * ) Notice: Subject to any disclaimer, the term of this patent is extended or adjusted under 35 U.S.C. 154(b) by 0 days.

(21) Appl. No.: 10/440,655

(22) Filed: May 19, 2003

(65) Prior Publication Data

US 2003/0218351 A1 Nov. 27, 2003

(30) Foreign Application Priority Data

May 22, 2002 (JP) ........................................ 2002-148282
May 22, 2002 (JP) ........................................ 2002-148283
May 22, 2002 (JP) ........................................ 2002-148284

(51) Int. Cl.$^7$ .............................................. B60J 10/00
(52) U.S. Cl. .......................................... 296/93; 296/213
(58) Field of Search .......................... 296/93, 213, 208; 428/156

(56) References Cited

U.S. PATENT DOCUMENTS 4,518,197 A * 5/1985 Gallitzendorfer et al. ... 296/213
5,074,610 A * 12/1991 Tamura et al. ................ 296/93

FOREIGN PATENT DOCUMENTS

| JP | 04159154 A1 | 6/1992 |
| JP | 04176744 A1 | 6/1992 |
| JP | 08118948 A1 | 5/1996 |
| JP | 08118949 | 5/1996 |
| JP | 08164737 A1 | 6/1996 |
| JP | 08164738 A1 | 6/1996 |

* cited by examiner

Primary Examiner—Patricia L. Engle
(74) Attorney, Agent, or Firm—Alexander P. Brackett

(57) ABSTRACT

In an integral drip molding in which a window guard section 21 along the front window W and a roof guard section 22 along the roof R are integrally formed, a lip section that contacts the front window W or the roof R is of a double construction, having an outer lip section 25 and inner lip section 26. The inner lip section 26 in the roof guard section 22 is positioned within a concave groove 28 formed at the portion where the roof R and the side panel 3 are connected, so that water that is forced into the rear section of the window guard section 21 flows into the concave groove 28 through a space S between the two lip sections 25 and 26. Thus overflow of water from the rear end of the window guard section to the side window is reliably prevented.

9 Claims, 9 Drawing Sheets

AUTOMOBILE DRIP MOLDING, MOUNTING CONSTRUCTION THEREOF AND METHOD OF MOUNTING

BACKGROUND OF THE INVENTION

1. Field of the Invention

The present invention relates to an automobile drip molding for preventing rainwater flowing from the front window (windshield) or roof towards the side window during running and interfering with the lateral field of view of the driver.

2. Description of the Related Art

As shown in FIG. 11, a drip molding comprises a window guard section 1 and a roof guard section 2, the window guard section 1 being mounted in the region where the vehicle body side panel 3 joins the front window W and the roof guard section 2 being mounted in the region where the side panel 3 joins the roof R, respectively, so as to prevent water from flowing out from the regions of these two junctions towards the side window and thereby safeguard the lateral field of view of the driver.

It should be noted that the window guard section 1 and the roof guard section 2 could be integrally formed in a linked fashion or could be separately formed and linked by a joint.

However, with conventional drip moldings, there were the following problems in achieving the desired object of preventing water from overflowing (water-damming action).

I. Problems Regarding the Sealing Properties of the Sealing Lip Section

As shown in FIG. 12 to FIG. 14, the drip molding is constituted by covering a core member 4 made of metallic sheet material formed by a roll forming method with a covering member R made of plastics or rubber by extrusion molding.

Also, over the entire length of the molding, there are respectively formed a first lip section 6 by one side portion in the width direction of the covering member 5 extending downwards and a second lip section 7 by an opposite side portion extending laterally; as shown in FIG. 12 and FIG. 13, the first lip section 6 performs a sealing action by contacting the surface of the front window W in the case of the window guard section 1 and as shown in FIG. 14 by contacting the roof 5 in the case of the roof guard section 2, respectively.

FIG. 12 is a cross-sectional view of the intermediate section in the longitudinal direction of the window guard section 1 and FIG. 13 is a cross-sectional view of the rear end thereof (portion that joins the roof guard section 2).

The second lip section 7 performs a sealing action by contacting the side panel 3 in the case of both the window guard section 1 and the roof guard section 2.

As shown in FIG. 12 to FIG. 14, the cross-sectional shape of the side panel 3 is different in the case of both contacting portions, the height dimension of this panel 3 facing the window-contacting portions (FIG. 12, FIG. 13) being greater than the height dimension of the roof-contacting portions (FIG. 14), so that the dimensions of the steps A, B between the window W or roof R and the side panel 3 are different.

Consequently, the cross-sectional shape of the molding corresponding to the difference of these step dimensions A, B i.e. the amount of protrusion C downwards of the first lip section 6 must be made larger in the case of the window guard section 1 and smaller in the case of the roof guard section 2.

As a measure for dealing with this, although not shown, the means may be adopted of making the two sections 1 and 2 of separate members of different cross-sectional shape and connecting these by a joint. However, this divided type of construction suffered from the difficulty that external appearance was adversely affected by the appearance of a joining portion of the two members.

Usually, therefore, the method is adopted of forming the amount of protrusion C of the first lip section 6 to be larger in the case of the window guard section 1 and smaller in the case of the roof guard section 2, by integrally forming the two sections 1 and 2 in continuous manner and filling up this difference between the step dimensions A, B by processing during or after molding.

If this is done, the amount of protrusion C of the first lip section 6 in the case of the window guard section 1 must be made smaller in the case of the rear end that joins the roof guard section 2, matching the change of the step dimensions A and B. Usually, this is accomplished by a gradual diminution from the front end to the rear end of the protrusion amount C in the case of this window guard section 1.

With such a conventional integral molding construction, the amount of protrusion C of the first lip section 6 (=molding height dimension) is smaller at the rear end of the window guard section 1, as described above, so, if a large quantity of water is forced into this portion by the action of the wiper or other causes, as shown by the double-lined arrow in FIG. 13, the water tends to overflow the molding and flow onto the front section of the side window. That is, conventionally, the water-damming action is poor, leading to the problem of obstruction of the lateral field of view of the driver.

It should be noted that, although the amount of protrusion C of the first lip section is also small in the case of the roof guard section 2, this is not subjected to the forcible ingress of a large quantity of water by wiper action such as at the rear end of the window guard section and, even if the water does overflow, this overflow occurs further to the rear than the intermediate section of the side window i.e. outside the lateral field of view of the driver, so scarcely any problem is caused.

II. Impairment of the Water-Damming Action Due to Mis-Positioning of the Molding Apart from dealing with water as described above, the drip molding also has the function of an ornamental cover maintaining an attractive appearance by hiding gaps or grooves of the connecting portions described above.

The drip molding is therefore mounted on these connecting portions after assembly of the side panel 3, front window W and roof R.

Also, this molding is mounted in releasable fashion at a plurality of locations indicated by the square symbol in FIG. 15 in respect of both the guard sections 1 and 2 and the aforesaid connecting portions, so as to facilitate replacement in the event of damage or for other reasons.

A conventional mounting construction is illustrated in FIG. 16 to FIG. 18.

FIG. 16 shows the mounting portion at the front end of the window guard section 1; FIG. 17 shows the mounting portion at a plurality of locations other than the front end of the window guard section 1; and FIG. 18 shows the mounting portion at a plurality of locations of the roof guard section 2, respectively.

As shown in FIG. 16, a front end mounting element 8 is mounted at the front end of the window guard section 1 and the front end of the window guard section is mounted by pushing a projection 9 of this front end mounting element 8 into an engagement hole 10 of the side panel 3.

Portions other than the front end of the window guard section 1 are mounted by front mounting elements 11 being mounted as shown in FIG. 17 at a plurality of locations other than the front end of the window guard section 1 and projections 12 provided on these mounting elements 11 being fitted into front receiving elements 13 of U-shaped cross-section fixed to the side panel 3.

The roof guard section 2 is mounted by rear mounting elements 14 being mounted as shown in FIG. 18 at a plurality of locations of the roof guard section 2 and projecting tabs 15 provided on these mounting elements 14 being fitted onto rear receiving elements 16 fixed to the side panel 3.

The mounting elements 8, 11, 14 and receiving elements 13, 16 are formed of plastics and the molding mounting force is obtained by means of resilient engagement or fitting of these elements.

Conventionally, a construction is adopted in which, as shown in the drawings, all of the projections 9 or the projecting tabs 12, 15 of the mounting elements 8, 11, 14 project downwards and are fitted in the downwards direction from above with respect to engagement holes 10 or receiving elements 13, 16 of the side panel i.e. an arrangement is adopted in which all parts of the molding are attached into position from above in the downwards direction at all the mounting locations.

However, with this conventional molding mounting construction in which the direction of attachment of the molding was the same at all locations (downwards from above), if, during use, upwardly directed external force caused the molding to become detached at one location, the external force could propagate to other portions, resulting in the molding easily becoming detached over a wide range (in the worst case, the entire molding), giving rise to the problem that the principal function of the molding to prevent the water invasion can no longer be achieved.

SUMMARY OF THE INVENTION

In order to solve the above problem, according to the present invention, the following construction is adopted.

The present invention is directed to a drip molding for an automobile comprising a window guard section mounted at a portion where the side panel and the front window of the vehicle body are connected and a roof guard section mounted at a portion where the side panel and the roof are connected, these guard sections being continuously and integrally formed, wherein lip sections that contact the front window or the roof are constituted by an outer lip section and inner lip section which are provided on one side in the molding width direction such that the outside and inner lip sections respectively protrude downwardly and are separated from each other in the lateral direction to define a space therebetween; the outer lip section in the window guard section faces the window with a gap defined therebetween, and is in contact with the roof in the roof guard section; the inner lip section in the window guard section is in contact with the window, and, in the roof guard section, is positioned in a concave groove formed at the connecting portion of the roof and the side panel; and in this condition, the space communicates with the interior of the concave groove.

Also according to the present invention, in a mounting construction of a drip molding for an automobile, the drip molding is releaseably mounted on a molding mounting portion of the vehicle body at a plurality of locations in the longitudinal direction and in a condition in which the directions of attachment thereof are different at least two locations.

Further according to the present invention, a method of releasably mounting a drip molding for an automobile, which comprises a window guard section mounted at the portion where the side panel and the front window of the vehicle body are connected and a roof guard section mounted at the portion where the side panel and the roof are connected, on the connection portions with an attachment procedure comprises the steps of: (1) attaching the rear end of the roof guard section; (2) attaching the portions of the roof guard section other than the rear end in a direction different from that of the rear end; (3) attaching the portions other than the front end of the window guard section in a direction different from that of the portions other than the rear end of the roof guard section; and (4) attaching the front end of the window guard section in a direction different from that of the portions other than the front end.

These and other objects, features, and advantages of the present invention will become more apparent upon reading the following detailed description along with the accompanying drawings.

DESCRIPTION OF THE PREFERRED EMBODIMENTS

First Embodiment (see FIG. 1 to FIG. 4)

Figure 1:
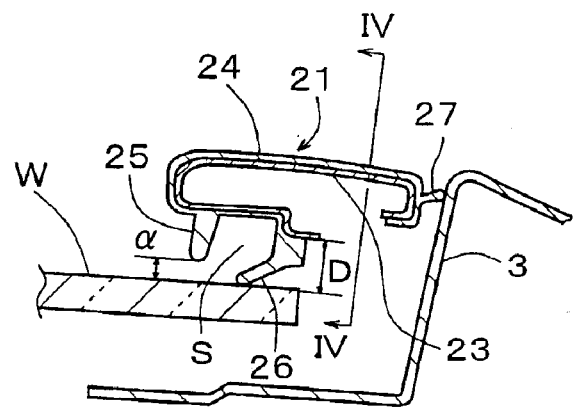
FIG. 1 is a cross-sectional view of a window guard section of a drip molding according to a first embodiment of the present invention.
Figure 2:
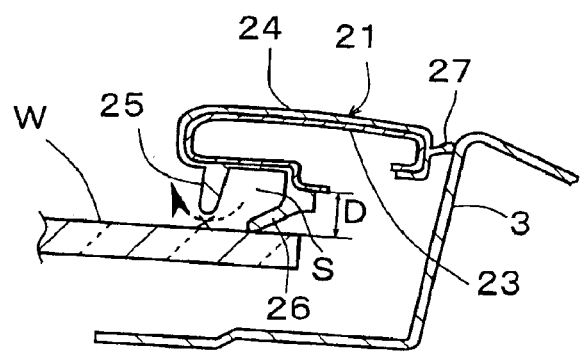
FIG. 2 is a cross-sectional view of the rear end of this window guard section.
Figure 3:
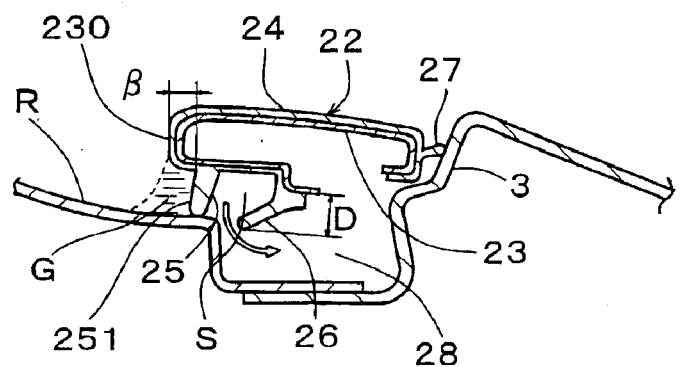
FIG. 3 is a cross-sectional view of the roof guard section thereof.

In this drip molding, in the same way as conventionally, the window guard section 21 shown in FIG. 1 and FIG. 2 and the roof guard section 22 shown in FIG. 3 are continuously formed in an integrated fashion, the window guard section 21 being mounted at the connection portion of the front window W and the side panel 3 and the roof guard section 22 being mounted at the connection portion of the roof R and the side panel 3, respectively. 23 is a core member constituted by roll forming of a metallic sheet member and 24 is a covering member attached at the outer periphery of this core member 23 by extrusion molding.

Figure 12:
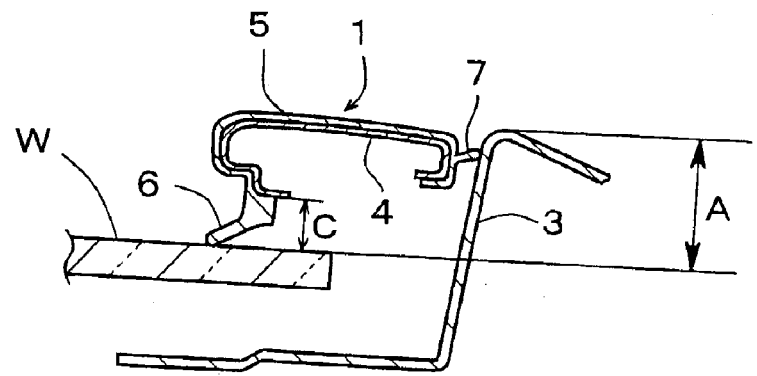
FIG. 12 is a cross-sectional view to a larger scale along the line XII—XII of FIG. 11.
Figure 13:
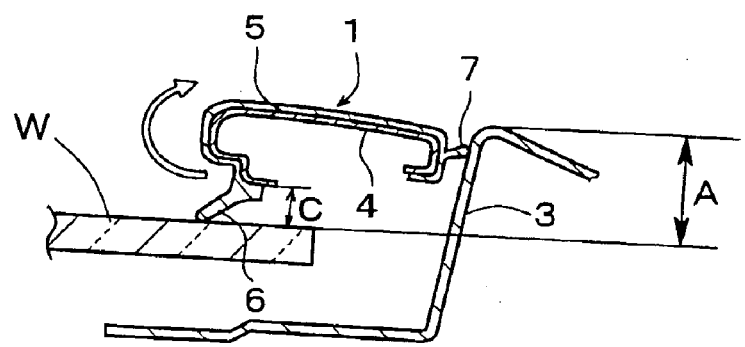
FIG. 13 is a cross-sectional view to a larger scale along the line XIII—XIII of FIG. 11.

Also, FIG. 1 shows the intermediate portion of the window guard section 21 corresponding to FIG. 12 and FIG. 2 shows the rear end of the window guard section corresponding to FIG. 13 (connection portion with the roof guard section 22), respectively.

Figure 14:
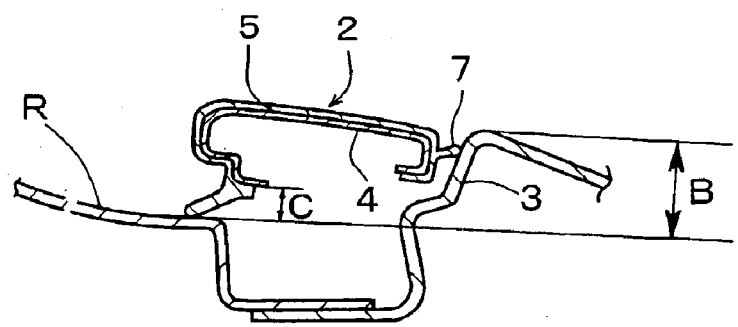
FIG. 14 is a cross-sectional view to a larger scale along the line XIV—XIV of FIG. 11.
Figure 15:
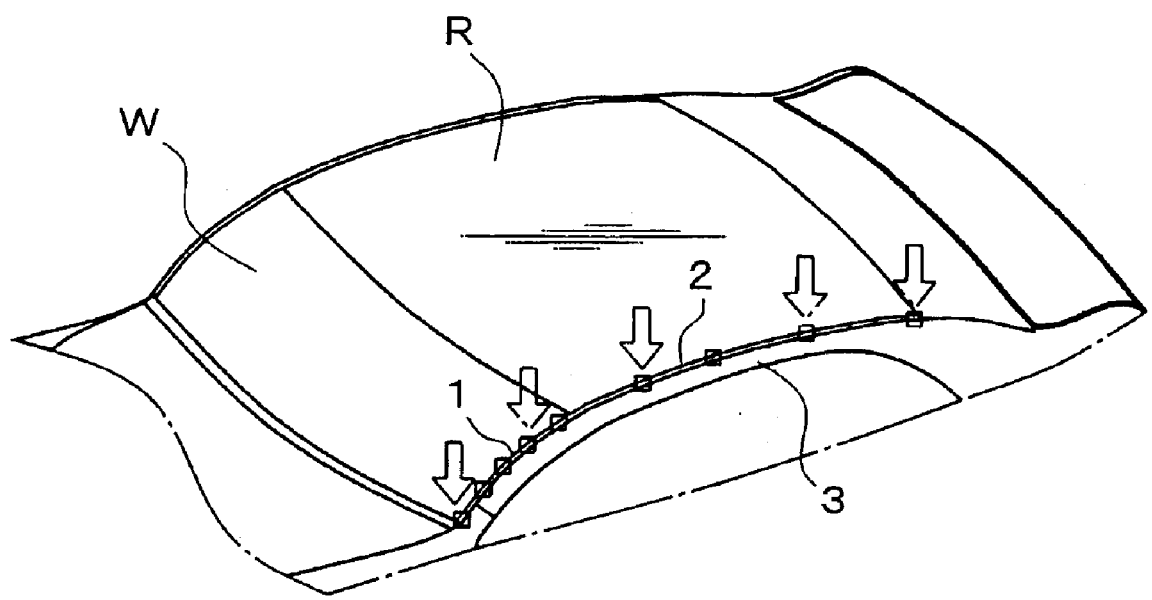
FIG. 15 is a diagrammatic perspective view of the top of an automobile given in explanation of the mounting construction of a prior art drip molding.

In this drip molding, on one side in the width direction of the covering member 24, as lip sections corresponding to the conventional first lip section 6 shown in FIG. 12 to FIG. 14, there are provided in projecting fashion an outer lip section 25 and inner lip section 26 that are downwardly directed with an interval therebetween on the left and right (along the lateral direction "L1" shown in FIG. 6), such that a space S is formed mutually therebetween and, on the opposite side, there is provided in laterally projecting fashion a second lip section 27 corresponding to the conventional second lip section 7 (contacting the side panel 3).

These lip sections 25, 26 and 27 are arranged on both the window guard section 21 and roof guard section 22 and, of these, the amounts of protrusion of the two outside and inner lip sections 25 and 26 and their positional relationships are set such as to satisfy the following conditions.

(1) As shown in FIG. 1 and FIG. 2, in the case of the window guard section 21, the outer lip section 25 faces the front window W in a condition with a gap a formed therebetween and, as shown in FIG. 3, in the case of the roof guard section 22, contacts the roof R.

(2) As shown in FIG. 1, in the case of the window guard section 21, the inner lip section 26 contacts the front window W and, as shown in FIG. 3, in the case of the roof guard section 22, is positioned in a concave groove 28 formed at the connection portion of the roof R and the side panel 3 and, in this condition, the gap S communicates with the interior of the concave groove 28.

With this drip molding, the inner lip section 26 that contacts the window W in the case of the window guard section 21 is positioned within the concave groove 28 in the case of the roof guard section 22 as stated above in (2), so, during running, water that is forced into the rear end of the window guard section 21 by the wiper action or other cause enters the gap S between the two lip sections 25 and 26 and flows therefrom into the concave groove 28 as shown in FIG. 3 and is thence discharged to the outside by passing through the passage constituted by this concave groove 28.

Also, during this process, the outer lip section 25 performs the role of a weir, preventing water that has entered this gap S from flowing back towards the front window as shown by the broken-line arrow in FIG. 2 and overflowing the window guard section 21.

The risk of such water flowing to the front of the side window by overflowing the rear end of the window guard section and obstructing the lateral field of view of the driver is thereby eliminated.

Also, a step β (see FIG. 3) is provided between the outside surface 251 of the outer lip section 25 and one remote end outside face 230 in the width direction of the molding (covering member 24).

By means of this step β, a rain gutter section G is formed between the molding and the roof R in the mounted condition of the molding and this rain gutter section G performs a drainpipe action, preventing the water at the roof guard section 22 from overflowing the molding.

Figure 4:
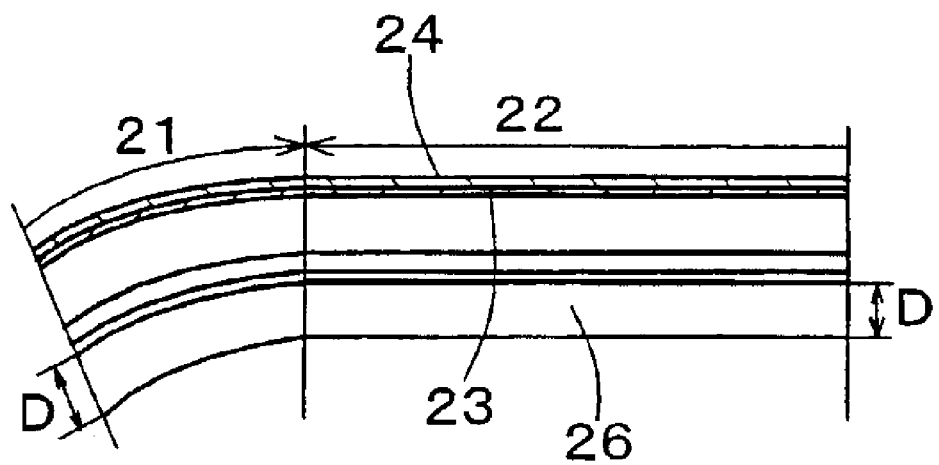
FIG. 4 is a cross-sectional view along the line IV—IV of FIG. 1.

As shown in FIG. 4 and other Figs., the amount of protrusion D of the inner lip section 26 progressively diminishes towards the rear end from the front end of the window guard section 21 and, in the case of the roof guard section 22, becomes fixed at the dimension of the rear end of the window guard section (portion indicated by the broken line in FIG. 4).

In this way, since the amount of protrusion D of this lip section becomes small in the case of the roof guard section 22, even in the case of a construction in which the lip section 26 is positioned within the concave groove 28, it is not necessary to make the concave groove 28 particularly deep to prevent the lip section 26 from striking the bottom of the concave groove 28, which would give rise to the problem of increasing the depth of the concave groove 28 reducing the living space in the vehicle.

However, although, in the first embodiment described above, a construction was adopted wherein the amount of protrusion D of the inner lip section 26 in the window guard section 21 diminished progressively towards the rear end from the front end, the amount of protrusion of this lip section 26 could be altered in various ways apart from this.

For example, it could be arranged for this amount of protrusion D of this lip section 26 to be a maximum in an intermediate section of the window guard section 21, or the amount of protrusion D could be set to the same dimension in the entire window guard section 21 or, further, the amount of protrusion D could be the same along the entire length of the molding, in the same way as the outer lip section 25.

Even in these cases, the desired object of the present invention in preventing water that has been forced into the space S at the rear end of the window guard section from overflowing by allowing the water to flow into the concave groove 28 in the roof guard section 22 can be fully achieved.

However, in this first embodiment, since the second lip section 27 is formed as a simple club-shaped tongue so that the leading end of this lip section 27 only makes line contact with the flat upright surface of the side panel 3, the contact stability of this lip section 27 is low with the result that noise is generated by severe minute vibrations of this lip section 27 produced by wind pressure during running.

Also, since the leading end of this lip section and the surface of the side panel rub against each other due to this vibration of the second lip section 27, there is a risk of the portion that contacts the side panel 3 being damaged in protracted use, or of deformation of this section 27, leading to impaired sealing thereof.

Figure 5:
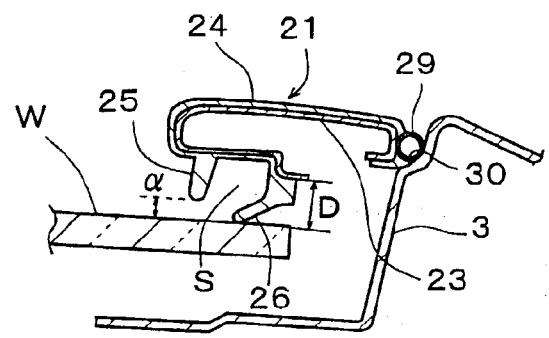
FIG. 5 is a cross-sectional view of the window guard section of a drip molding according to a modification of the first embodiment.

The construction shown in FIG. 5 may therefore be adopted as a countermeasure in this respect.

The second lip section 29 is of hollow cross sectional shape and its outer peripheral surface is formed in arc shape.

A step 30 is formed at the portion in the side panel 3 that is contacted by this second lip section 29.

This step 30 is formed in arc shape along the outer peripheral surface of the second lip section 29, the outer peripheral surface of this lip section 29 being constituted so as to adhere to the step 30 in a face-contacting condition.

FIG. 5 shows by way of example the contacting portion of the second lip section 29 and the step 30 at the portion where the front window W and the side panel 3 shown in FIG. 1 are connected; however, the same contacting condition as in the case of FIG. 5 is also obtained in the case of the portion where the roof R and the side panel 3 shown in FIG. 3 are connected.

If this is done, the following benefits are achieved.

(A). By forming the second lip section 29 of hollow cross-sectional shape, the rigidity and strength thereof can be raised. The deformation that is the precondition of vibration of the lip section can thereby be suppressed.

(B). Since this second lip section 29 makes face contact with the step 30 of the side panel 3 that is formed in arc shape along the outer peripheral surface of this lip section 27, the peripheral area of this lip section 29 becomes large, due to this hollow shape and, concomitantly, in comparison with the case of the second lip section 27 shown in FIG. 1 to FIG. 3, the contact area of the second lip section 29 and the side panel 3 is very greatly increased.

(C). Since the external force in both the downward and lateral directions acting on this lip section 29 is supported by the step 30, the supporting force of this lip section 29 produced by the side panel 3 is increased.

(D). Since the outer periphery of the lip section 29 and the step 30 are in contact at an arc face, even if there is some degree of manufacturing error or error in assembly, a face-contacting condition can easily be ensured and all of the external force acting on the lip section 29, no matter what the direction of origin of this force, is received by the step 30.

By the synergetic effect of these features, much greater stability of the contacting condition of the second lip section 29 with the side panel 3 can be achieved than in the case where, as shown in FIG. 1 to FIG. 3, a tongue-shaped lip section 27 is made to contact the flat upright face of the side panel 3.

In this way, vibration of the second lip section 29 due to wind pressure during running is suppressed and generation of noise by this vibration or surface damage to the side panel 3 due to these two rubbing together or deformation of the lip section 29 can be prevented.

Also, by means of the above a to d, the molding supporting force at the second lip section 29 can be greatly raised compared with conventionally, so deformation of the molding as a whole due to external force can be prevented.

Second Embodiment (see FIG. 6 to FIG. 10)

Figure 6:
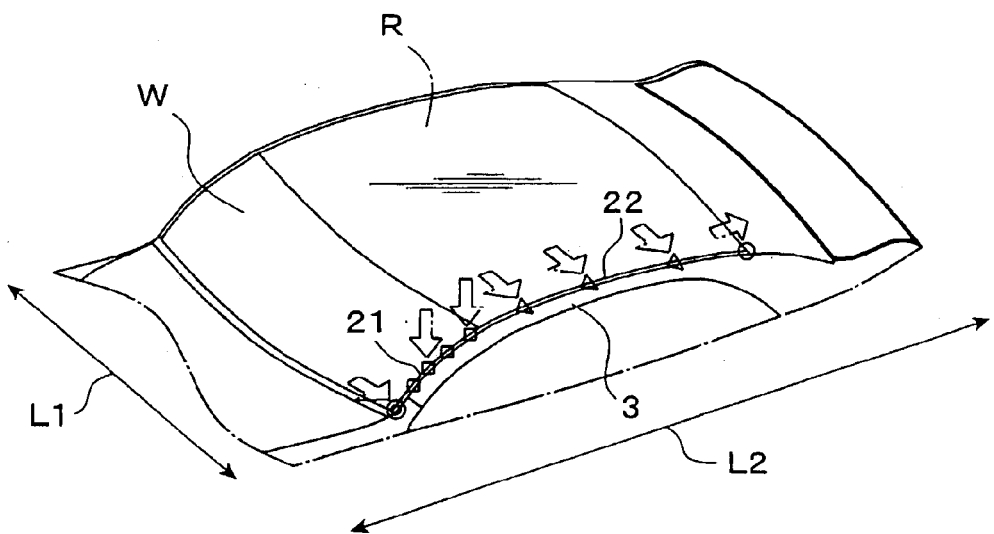
FIG. 6 is a diagrammatic perspective view of the top of an automobile on which a drip molding according to a second embodiment of the present invention is mounted.

FIG. 6 illustrates the condition in which a drip molding according to a second embodiment is attached to an automobile. Note that a line with "L1" indicates a lateral direction of the automobile (or a vehicle) and a line with "L2" indicates a longitudinal direction (or lengthwise direction) of the automobile (or a vehicle).

In this Fig., the double-circle symbol indicates the front end of the window guard section 21, the square symbol indicates the portions other than the front end of this window guard section 21, the triangle symbol indicates portions other than the rear end of the roof guard section 22 and the circle symbol indicates the mounting location at the rear end of this guard section 22, respectively; the molding is releaseably attached at these respective locations as described in the following sequence (1) to (4).

(1) Attachment of the rear end (circle symbol portion) of the roof guard section 22 onto the rear from the front along the longitudinal direction ("L2")

(2) attachment of the other portions (triangle symbol portions) of the roof guard section 22 onto the outside from the inside of the vehicle along the lateral direction ("L1") of the automobile;

(3) attachment of the portions (square portions) other than the front end of the window guard section 21 in the downwards direction from above; and (4) attachment of the front end (double-circle symbol portion) of the window guard section 21 onto the outside from the inside of the vehicle along the lateral direction of the automobile.

Next, the details of the mounting construction of the various sections are described with reference to FIG. 7 to FIG. 10.

Figure 7:
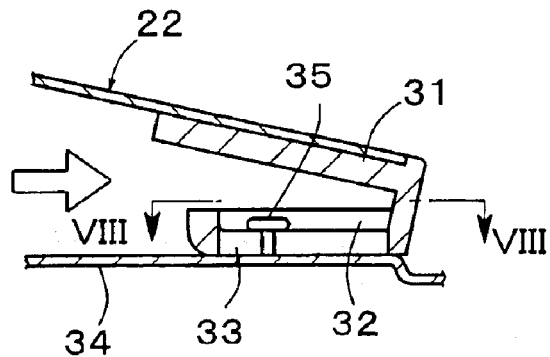
FIG. 7 is a cross-sectional view to a larger scale showing the mounting construction of the rear end of the roof guard section of this molding.
Figure 8:
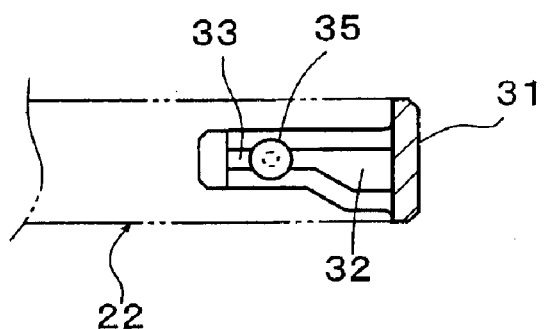
FIG. 8 is a cross-sectional view along the line VIII—VIII of FIG. 7.

Attachment according to (1) above (the rear end of the roof guard section 22=the circle symbol portion of FIG. 6) (see FIG. 7 and FIG. 8)

The rear end mounting element 31 is mounted on the rear end of the roof guard section 22. A guide hole 32 of large width at the rear and an engagement hole 33 of small width are provided at the front in mutual communication in this mounting element 31; the roof guard section rear end is attached from the front to the rear by fitting a stud 35 that projects on a connection section 34 of the roof R facing the side panel into this engagement hole 33 through the guide hole 32.

Figure 9:
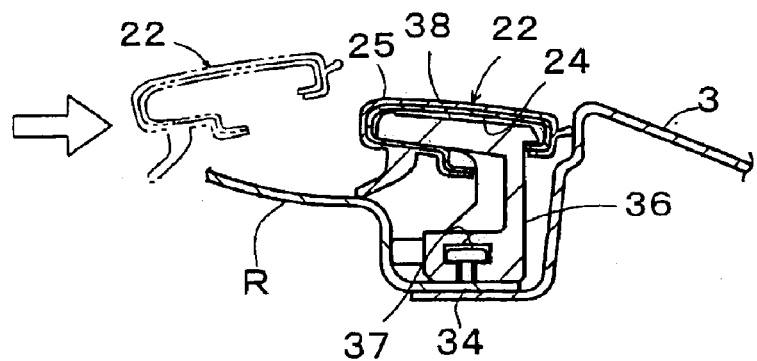
FIG. 9 is a cross-sectional view to a larger scale showing the mounting construction of portions other than the rear end of this section.

Attachment according to (2) above (portions other than the rear end of the roof guard section 22=the triangle symbol portion of FIG. 6) (see FIG. 9)

The rear mounting element 36 is mounted by studs 37 at a plurality of locations to the front and to the rear of the connection section 34 of the roof R facing the side panel.

At the top of this mounting element 36, there is provided a molding engagement section 38 that is somewhat narrower in width than the width of the molding; the portions other than the rear end of the roof guard section 22 are attached by fitting this roof guard section 22 of the molding to this molding engagement section 38 from inside the vehicle body towards the outside.

In this process, after being engaged with the molding engagement section 37 in the direction of the double-line arrow in the Fig. in an attitude that is inclined a little outwards and upwards, indicated by the double-dotted chain line in the Fig., the roof guard section 22 is fitted with the molding engagement section 37 by being returned to the attitude shown by the continuous lines by utilizing the resilience of the molding engagement section 38.

Attachment according to (3) above (portions other than the front end of the window guard section 21=square symbol portion of FIG. 6) (not shown in the drawing)

Figure 17:
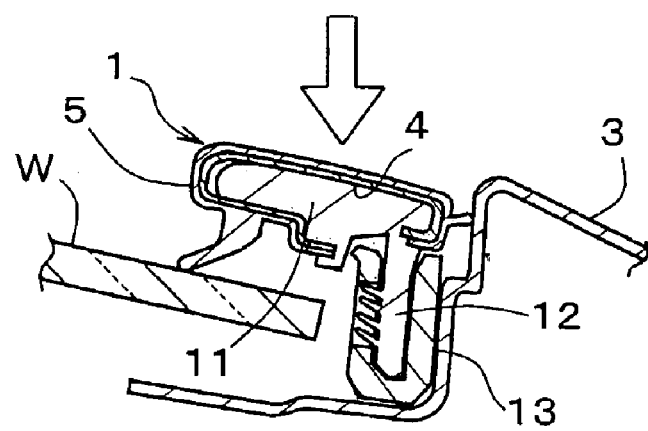
FIG. 17 is a cross-sectional view to a larger scale showing the mounting construction of portions other than the front end of this section.
Figure 18:
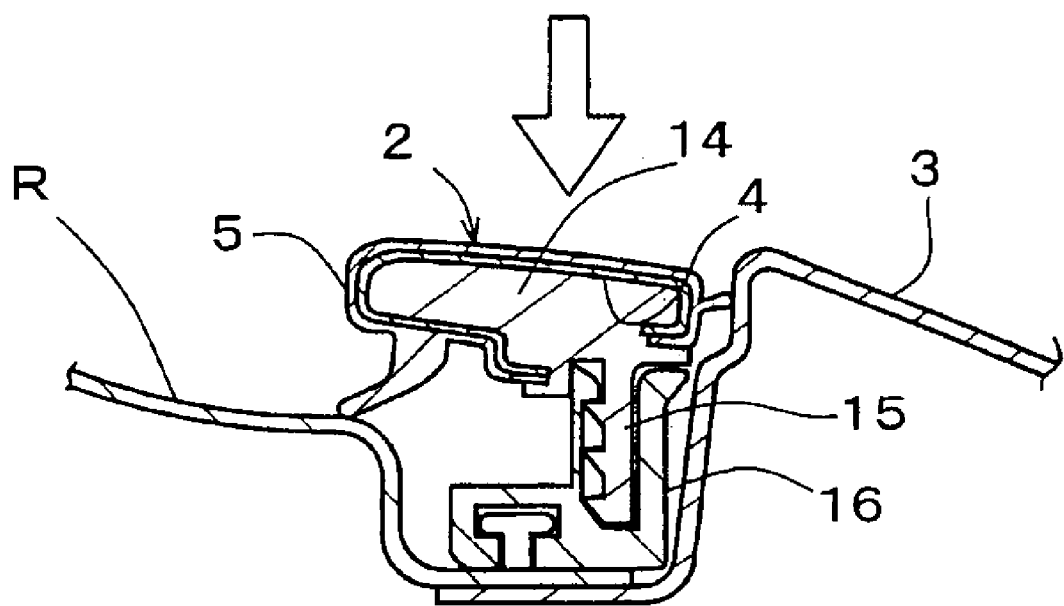
FIG. 18 is a cross-sectional view to a larger scale showing the mounting construction of the roof guard section of this molding.

These portions have the same construction as in FIG. 17 (conventional mounting construction of the window guard section 1); specifically, the projection 12 of the front mounting element 11 mounted at a plurality of locations in the longitudinal direction is attached from above in the downwards direction by resiliently fitting with receiving elements 13 of U-shaped cross section mounted on the side panel 3.

Figure 10:
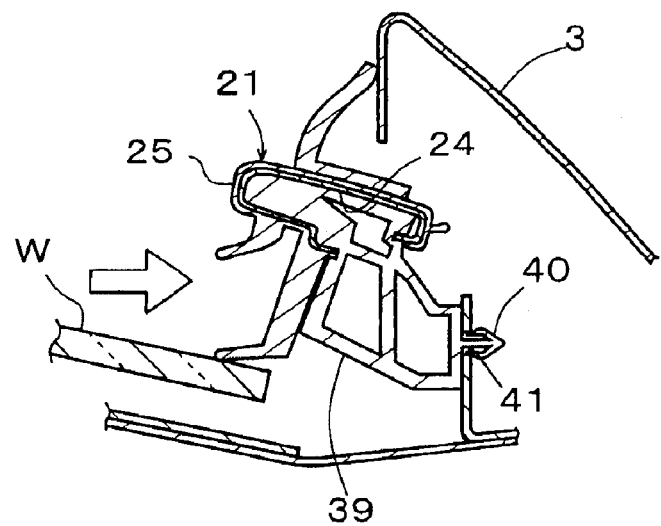
FIG. 10 is a cross-sectional view to a larger scale showing the mounting construction of the rear end of the window guard section of this molding.
Figure 11:
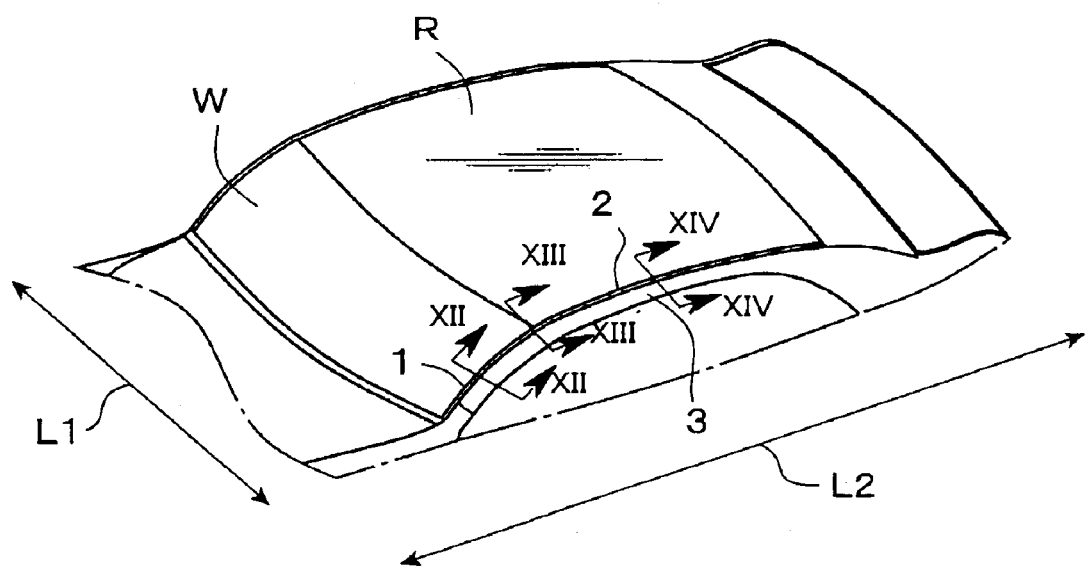
FIG. 11 is a diagrammatic perspective view of the top of an automobile, given in explanation of the construction of a prior art drip molding.

Attachment according to (4) above (front end of the window guard section 21=double-circle symbol portion of FIG. 6) (see FIG. 10)

A front end mounting element 39 is mounted at the front end of the roof guard section 21.

Figure 16:
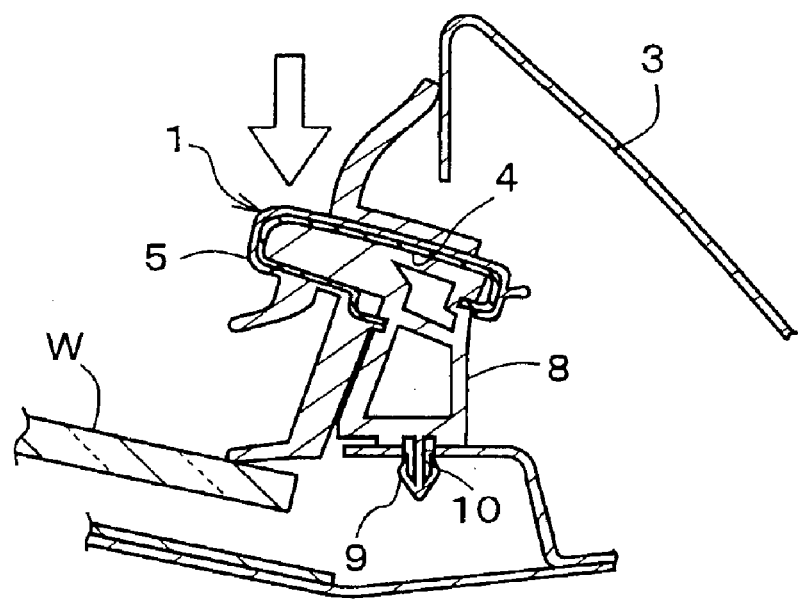
FIG. 16 is a cross-sectional view to a larger scale showing the mounting construction of the front end of a window guard section of this molding.

In the case of the mounting construction of the front end of the conventional roof guard section shown in FIG. 16, a downwardly directed projection 9 is provided on the front end mounting element 8 and this projection 9 is engaged from above in the downwards direction with the engagement hole 10 of the side panel 3. In contrast, in the present construction, a projection 40 is provided on the front end of mounting element 39 directed to outside the vehicle body and the front end of the window guard section is attached from inside the vehicle body towards the outside by resilient engagement of this projection 40 with the engagement hole 41 provided in laterally directed fashion on the side panel 3.

With this molding mounting construction, as described above, the direction of attachment of the molding (i) is different in the case of the window guard section 21 (downwards from above) and in the case of the roof guard section 22 (from inside the vehicle body towards the outside);

(ii) is different at the front end of the window guard section 21 (from inside the vehicle body towards the outside) and at portions other than this (downwards from above); and (iii) is different at the rear end of the roof guard section 22 (rearwards from the front) and at portions other than this (from inside the vehicle body towards the outside).

In other words, since attachment at a plurality of locations of the molding is effected with three types of directionality, namely, vertical, lateral (inside/outside the vehicle body) and longitudinal, a fundamental benefit is that even if some part becomes detached by external forces, propagation of the external force to other portions whose direction of attachment is different can be suppressed.

In particular, in the molding according to this embodiment in which the window guard section 21 and the roof guard section 22 are integrally formed, even if one of the two guard sections 21, 22 is detached, external force is not transmitted to the other guard section.

Furthermore, since, in both the respective guard sections 21 and 22, the direction of attachment is changed as between the ends, where external force is liable to act, and portions other than these, external force acting on the ends cannot be propagated to the intermediate sections of the molding.

By the synergetic effect of these features, any detachment of the molding due to external force is restricted to a minimum range and detachment of the molding as a whole can thereby be reliably prevented.

The basic water-damming action of the molding can therefore be reliably achieved.

Furthermore, since the rear end of the roof guard section 2 is attached first and the other portions are attached after the rear end of the roof guard section has been located in position, if for example, due to error regarding the molding dimensions or to errors in assembly of the vehicle body or other reasons, excessive length is generated at the front end of the window guard section 1, this excessive length can be accommodated by more of the molding being pushed into the bonnet; alternatively, in the case of insufficiency of the length, the amount that is pushed into the bonnet can be reduced or a similar adjustment can easily be made.

Modified Examples of the Second Embodiment (1) Although, in the second embodiment described above, the procedure was adopted of attaching the molding in the sequence: rear end of the roof guard section 22→ other portions of this section 22→ portions of the window guard section 21 other than the front end thereof→ front end of this section i.e. of attaching from the rear to the front, would be possible to adopt the reverse procedure of attaching from the front to the rear, or to adopt the procedure of attaching both the front and rear ends after attaching the intermediate section of the molding.

However, as a result of trial and error by the inventors, it has been established that greatest ease of operation is achieved if the molding is mounted with the attachment procedure and directionality of the embodiments described above.

(2) Instead of the second embodiment described above, it would be possible to make only the direction of attachment of the window guard section 21 and roof guard section 22 different, or to make only the direction of attachment of the front and rear ends of the molding and portions other than these different.

(3) The specific molding attachment construction of the various sections could be altered in various ways, apart from as in the second embodiment described above. For example, as the construction for attachment in the front and rear directions, instead of the construction shown in FIG. 7 and FIG. 8, a tunnel-shaped engagement section could be provided on the connection section 34 of the roof R facing the side panel, instead of the stud 35 or a construction could be adopted of inserting and engaging a rearwardly directed projection provided on the rear end mounting element 31 with this engagement section.

As described above, according to the present invention, in an integral drip molding, the desired object of preventing overflow of water can reliably be achieved.

Specifically, according to the present inventions as described above, thanks to the adoption of a construction in which the lip section that contacts the front window or the roof is made of a double structure comprising an outer lip section and an inner lip section, the inner lip section being positioned in a concave groove formed at the connection portion of the roof and the side panel in the case of the roof guard section, water that is forced into the rear end of the window guard section is caused to flow in the concave groove through the space between these two lip sections and can thence be discharged to the outside using this space as a passage.

Also, by the weir action of the outer lip section under these circumstances, backflow of water that has entered this space can be prevented.

By these two actions, it is possible to reliably prevent water from overflowing the rear end of the window guard section and obstructing the lateral field of view of the driver by flowing onto the front section of the side window.

Furthermore, since the direction of attachment of the molding is made different at least two locations in the longitudinal direction, even if one location becomes detached due to external force, propagation of the external force in the portion whose direction of attachment is different is suppressed, thereby enabling detachment over a wide range of the molding to be restrained.

In particular, since the direction of attachment is different at all of the ends and intermediate section of the window guard section and roof section and mutually continuous portions of these two guard sections, a particularly strong molding detachment preventing effect can be achieved.

This application is based on Japanese patent application serial Nos. 2002-148282; 2002-148284; and 2002-148283, filed in Japan Patent Office on May 22, 2002, the contents of which are hereby incorporated by reference.

Although the present invention has been fully described by way of example with reference to the accompanying drawings, it is to be understood that various changes and modifications will be apparent to those skilled in the art.

Therefore, unless otherwise such changes and modifications depart from the scope of the present invention hereinafter defined, they should be construed as being included therein.

What is claimed is:

1. A drip molding for an automobile comprising:
    a window guard section mounted at a portion where a side panel and a front window of a vehicle body are connected;
    a roof guard section mounted at a portion where the side panel and a roof are connected, said window guard section and said roof guard section being continuously and integrally formed; and
    a lip portion provided on one surface of the molding and extending over the substantial length of the drip molding, said lip portion is adapted to contact the front window or the roof of the automobile, said lip portion including:
        an outer lip, and
        an inner lip, both lips being provided on the one surface of the molding in such a manner that the outer and inner lips respectively protrude downwardly and are separated from each other in the lateral direction of the molding to define a space therebetween;
    wherein said outer lip in said window guard section faces the window with a gap defined therebetween, and said outer lip is in contact with the roof in said roof guard section; and
    wherein said inner lip in said window guard section is in contact with the window and said inner lip in said roof guard section is positioned in a concave groove formed at the connecting portion of the roof and the side panel of the automobile and wherein said space communicates with the interior of said concave groove.

2. The drip molding according to claim 1 wherein the inner lip is formed such that the amount of protrusion thereof is larger in the window guard section than that in the roof guard section.

3. The drip molding according to claim 1 wherein a step is formed between the external side surface of the outer lip and the external surface of a remote edge of said molding in the lateral direction of the vehicle body so as to form a rain gutter section when the molding is mounted onto the automobile.

4. The drip molding according to claim 3, further comprising a second lip extending over the substantial length of the molding and said second lip protruding substantially in the lateral direction from the side of the molding opposite from said remote edge in said lateral direction of the molding.

5. The drip molding according to claim 4, wherein said inner lip extends from a lower surface of the molding in an obliquely downward direction and said outer lip extends from said lower surface in a substantially downward direction.

6. The drip molding according to claim 5, wherein the amount of protrusion of the inner lip in a downward direction is set greater than that of the outer lip in the downward direction from the lower surface of the molding.

7. A drip molding as claimed in claim 1 wherein said outer lip is a cantilever type elastic member.

8. A drip molding for an automobile comprising:
    a window guard section mounted at a portion where a side panel and a front window of a vehicle body are connected;
    a roof guard section mounted at a portion where the side panel and a roof are connected, said window guard section and said roof guard section being continuously and integrally formed;
    a core member made of metallic sheet; a covering member attached to said core member at an outer periphery thereof, said covering member having a lip portion provided on one surface of the core member and extending over the substantial length of the drip molding, said lip portion is adapted to contact the front window or the roof of the automobile, said lip portion including:
        an outer lip, and
        an inner lip, both lips being provided on the one surface of the molding in such a manner that the outer and inner lips respectively protrude downwardly and are separated from each other in the lateral direction of the molding to define a space therebetween;
    wherein said outer lip in said window guard section faces the window with a gap defined therebetween, and said outer lip is in contact with the roof in said roof guard section; and
    wherein said inner lip in said window guard section is in contact with the window and said inner lip in said roof guard section is positioned in a concave groove formed at the connecting portion of the roof and the side panel of the automobile and wherein said space communicates with the interior of said concave groove.

9. A drip molding as claimed in claim 8 wherein said outer lip extends from the lower surface of said core member in a direction substantially downward and said inner lip extends from the lower surface of the core member in a direction laterally inwardly towards a center of a vehicle.

* * * * *